(12) United States Patent
Menke et al.

(10) Patent No.: US 7,857,117 B2
(45) Date of Patent: Dec. 28, 2010

(54) BOTTLE INVERTING AND BOTTLE DRAINING STATION CONFIGURED TO DRAIN RINSED BOTTLES FROM A RINSER IN A CONTAINER FILLING PLANT

(75) Inventors: Herbert Menke, Burgbrohl (DE); Martin Weisgerber, Stolberg (DE); Ralph Pohl, Rheinbrohl (DE)

(73) Assignee: KHS AG, Dortmund (DE)

( * ) Notice: Subject to any disclaimer, the term of this patent is extended or adjusted under 35 U.S.C. 154(b) by 98 days.

(21) Appl. No.: 12/269,330

(22) Filed: Nov. 12, 2008

(65) Prior Publication Data

US 2009/0218194 A1    Sep. 3, 2009

Related U.S. Application Data

(63) Continuation-in-part of application No. PCT/EP2007/004178, filed on May 11, 2007.

(30) Foreign Application Priority Data

May 13, 2006    (DE) .................. 10 2006 022 465

(51) Int. Cl.
   *B65G 47/24* (2006.01)
(52) U.S. Cl. .............. 198/403; 198/402; 198/406
(58) Field of Classification Search .......... 198/402, 198/403, 404, 406, 408, 410
See application file for complete search history.

(56) References Cited

U.S. PATENT DOCUMENTS

| | | | | |
|---|---|---|---|---|
| 2,485,373 | A | * | 10/1949 | Farrell ................. 198/402 |
| 3,367,472 | A | | 2/1968 | Rossi |
| 5,598,859 | A | * | 2/1997 | Kronseder .............. 198/404 |
| 6,209,705 | B1 | * | 4/2001 | Drewitz ................ 198/404 |
| 6,905,012 | B2 | | 6/2005 | Lopes |
| 7,331,156 | B2 | * | 2/2008 | Hartness et al. ........ 198/470.1 |

FOREIGN PATENT DOCUMENTS

| | | |
|---|---|---|
| DE | 184 304 | 8/1907 |
| DE | 41 28 733 | 3/1993 |
| EP | 0 573 352 | 12/1993 |
| EP | 0 875 459 | 11/1998 |

OTHER PUBLICATIONS

International Search Report PCT/EP2007/004178 and English translation thereof.
International Preliminary Report on Patentability PCT/EP2007/004178 and English translation thereof.

* cited by examiner

*Primary Examiner*—James R Bidwell
(74) *Attorney, Agent, or Firm*—Nils H. Ljungman & Associates

(57) ABSTRACT

A conveyor for transporting bottles from a sterilization machine or rinsing machine to a filling machine, in which the container mount, which is configured to move around and/or all along at least one axis on the transport element, is moved to invert a container to allow that container to drain or empty before being filled with a liquid beverage material at a filling station in a beverage bottling plant.

20 Claims, 9 Drawing Sheets

BOTTLE INVERTING AND BOTTLE DRAINING STATION CONFIGURED TO DRAIN RINSED BOTTLES FROM A RINSER IN A CONTAINER FILLING PLANT

CONTINUING APPLICATION DATA

This application is a Continuation-In-Part application of International Patent Application No. PCT/EP2007/004178, filed on May 11, 2007, which claims priority from Federal Republic of Germany Patent Application No. 10 2006 022 465.5, filed on May 13, 2006. International Patent Application No. PCT/EP2007/004178 was pending as of the filing date of this application. The United States was an elected state in International Patent Application No. PCT/EP2007/004178.

BACKGROUND

1. Technical Field

The present application relates to a conveyor for bottles or similar containers having at least one powered, closed loop transport element, with at least one container mount on the transport element for at least one container.

2. Background Information

Background information is for informational purposes only and does not necessarily admit that subsequently mentioned information and publications are prior art.

With some known conveyors, multiple mounts from which one bottle each is suspended by means of vacuum are arranged on a powered, closed-loop transport element in the form of a chain.

OBJECT OR OBJECTS

The object of the current present application is to describe a conveyor by means of which it is possible to transport the containers, and it is also possible to move and/or position the containers and container mounts by control action during the transport or while on the transport path formed by the conveyor.

SUMMARY

A conveyor for achieving this object is disclosed in the present application as a conveyor for bottles or similar containers having at least one powered, closed loop transport element. The transport element has at least one container mount for at least one container. At least one container mount is designed to move around and/or along at least one axis on the transport element.

The conveyor according to the present application is suitable for both empty and filled containers.

Containers within the meaning of the present application include bottles or bottle-like containers, but also other containers or packaging of metal and/or plastic and/or cardboard, and also in at least one possible embodiment for cans, jars, tubes, etc.

In at least one embodiment of the present application, the conveyor can be used to transport bottles from a sterilization machine or rinsing machine to a filling machine. The container mount, which is configured to move around and/or all along at least one axis on the transport element, is moved to invert a container to allow that container to drain or empty before being filled with a liquid beverage material at a filling station in a beverage bottling plant.

In at least one possible embodiment of the present application, the conveyor of the present application is used in a rinsing machine.

In at least one possible embodiment of the present application, the conveyor of the present application is used in a labeling machine.

Developments of the present application are described according to at least one possible embodiment of the present application.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One possible embodiment of the present application is described in greater detail below illustrated with the accompanying drawings, in which.

DESCRIPTION OF EMBODIMENT OR EMBODIMENTS

Figure 1:
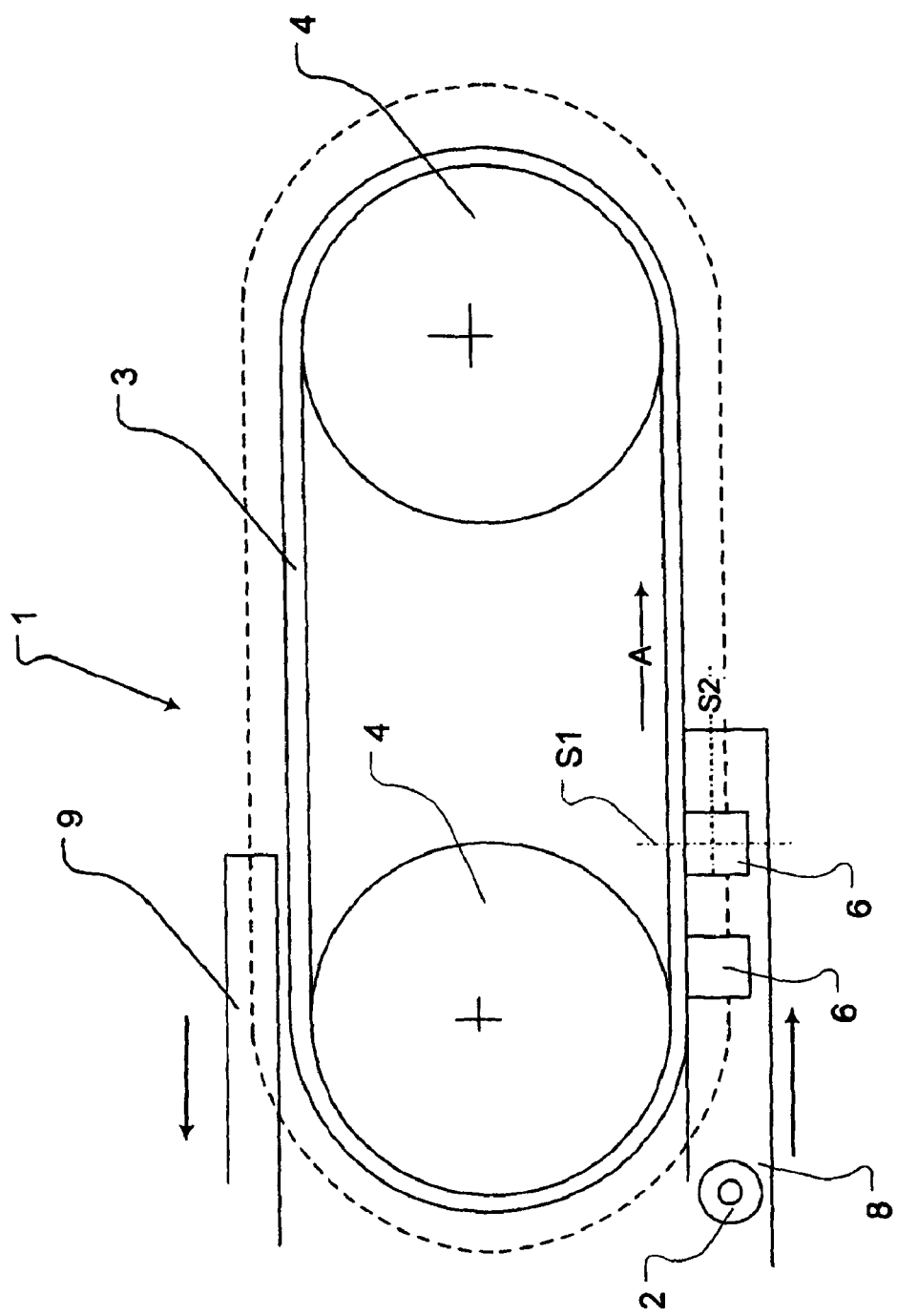
FIG. 1 shows a rough schematic and a plan view of a conveyor for the transport of containers in the form of bottles.

In the Figures, 1 is a conveyor for the transport of bottles 2 and also for the controlled positioning and/or movement of the bottles 2 on the conveyor 1 during transport and/or on the transport path formed by the conveyor 1.

In the embodiment shown, the conveyor 1 comprises a transport element 3 forming a closed loop, which transport element 3 is formed by at least one flexible belt and/or band and/or at least one chain, and which in the embodiment shown is passed over two deflecting rollers or wheels 4, each of which is so mounted as to rotate around a vertical axis, so that in the embodiment shown the transport element 3 forms an oval loop arranged in a horizontal or nearly horizontal plane.

In another possible embodiment according to the present application, the two deflecting rollers or wheels 4. The deflecting wheels 4 our configured to rotate about a horizontal axis, so that in this possible embodiment, the transport element 3 forms an oval loop arranged in a vertical or nearly vertical plane.

Given an appropriate number and/or configuration of the deflecting wheels 4, the transport element 3 can, of course, also have another shape.

At least one of the deflecting wheels 4 is joined by means of a powered connection to a drive (not shown), so that the transport element 3 circulates in a transport or conveying direction A when the conveyor is on. To achieve a reliable and reasonably positionally accurate drive for the transport element 3, means are provided on the driven deflecting wheel 4 and the transport element 3 that essentially ensure or promote that the transport element is driven as slip-free as possible by the driven deflecting wheel 4. In the simplest case, these means can be in form of a friction clutch between the driven deflecting wheel 4 and the transport element 3. Another possibility is to provide the transport element with an engaging device for a carrier element on the driven deflecting wheel 4, for example in a form whereby the transport element 3 is in the form of a toothed belt on the inside of the loop formed by this element or is provided with gearing 5, which then interacts with corresponding gearing on the driven deflecting wheel 4.

Figure 2:
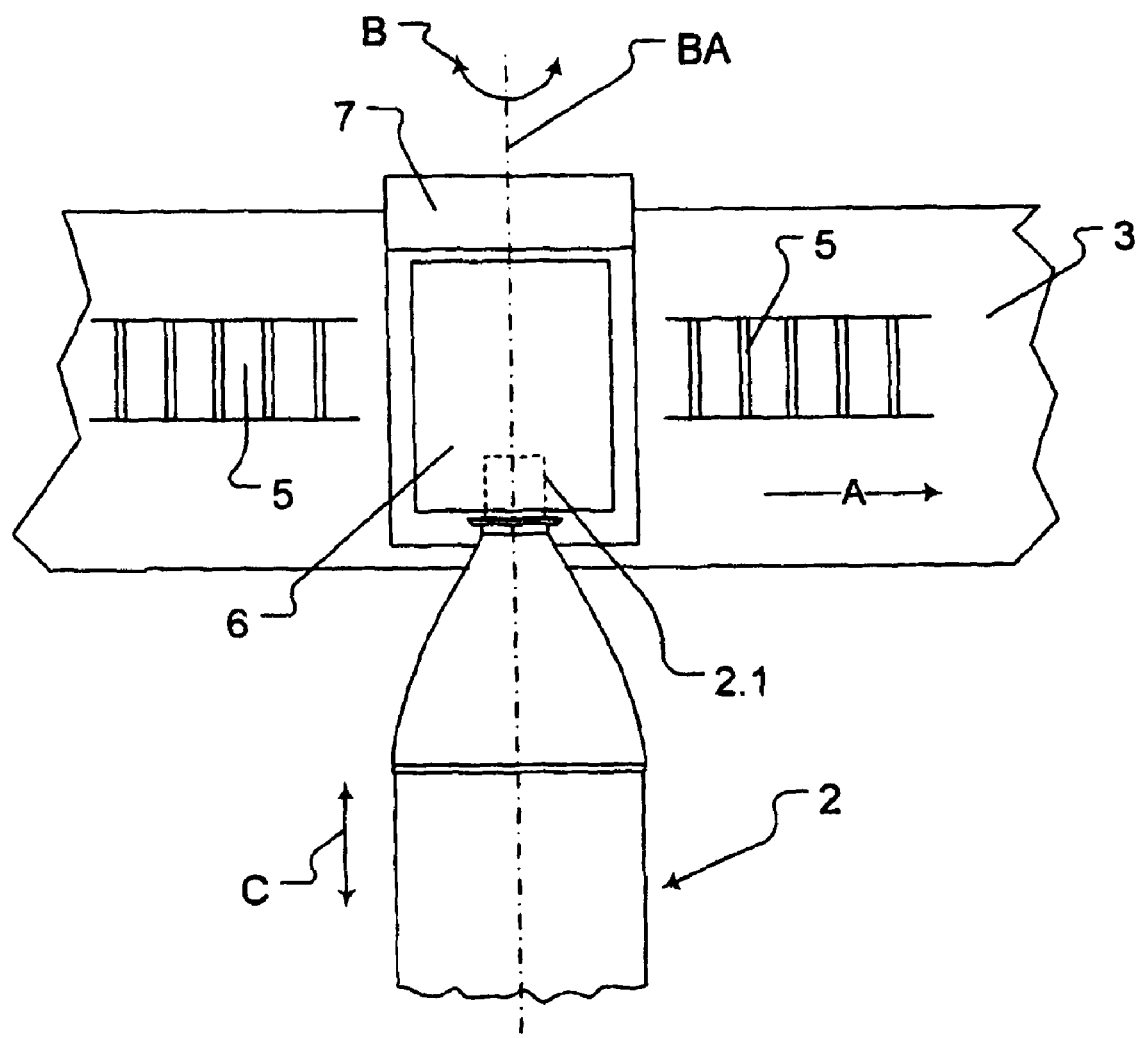
FIG. 2 is a simplified representation of one of the container mounts of the conveyor shown in FIG. 1.

As seen in FIG. 2, container mounts 6 are arranged on the transport element 3 offset from one another in the direction of transport A, in one possible embodiment of the present application, on that side of the transport element 3 forming the outside of the loop. Each container mount 6 is fastened to the transport element 3 by means of a holder 7 and is easily replaced in one possible embodiment.

Furthermore, the container mounts 6 are designed as gripper heads, for example, so that the respective bottle 2 is held suspended from the respective container mount 6 by its mouth 2.1.

The bottles 2 are fed in a standing position via a transport band 8 serving as a container inlet, at which point they are grabbed sequentially by one container mount 6 each and moved together with the mount in the direction of transport A to a transport band 9 forming a container outlet.

Figure 3:
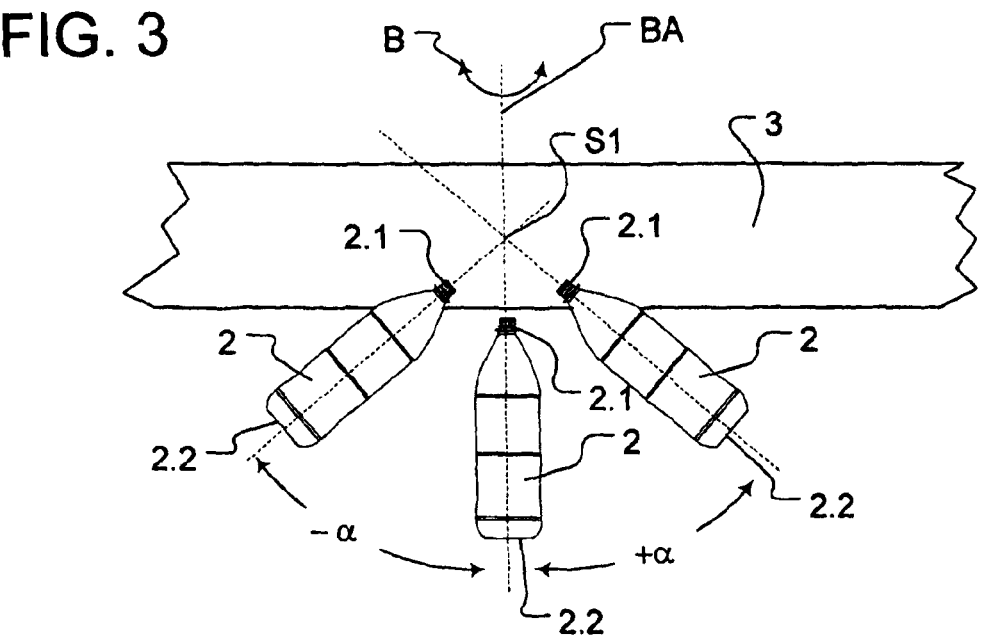
FIGS. 3 and 4 show a schematic of a belt-like transport element of the conveyor together with bottles in various positions relative to the transport element.
Figure 4:
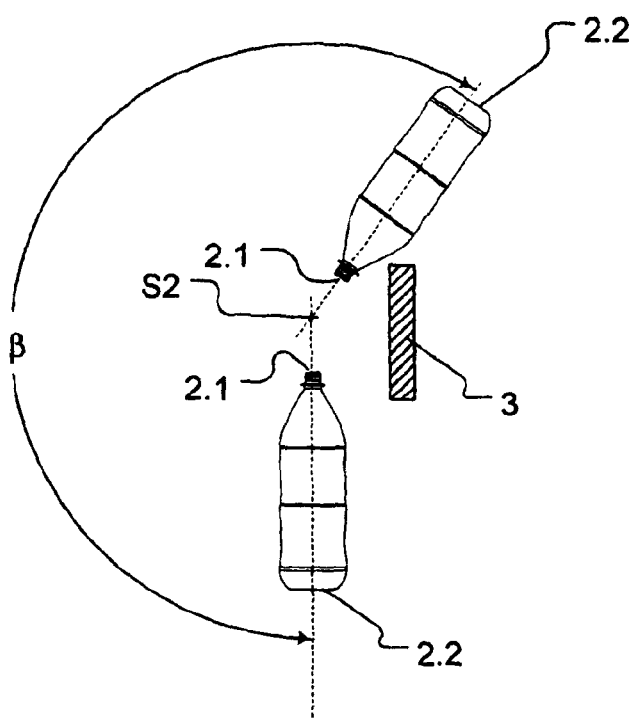

Each container mount 6 is attached to the corresponding holder 7 such as to allow for movement around and along multiple axes, and as shown in FIGS. 3 and 4 for controlled swivel movements around two preferably horizontal swivel axes S1 and S2 oriented perpendicular or virtually perpendicular to one another.

In one possible embodiment of the present application, the holder 7 is connected to or comprises a pivoting arrangement that is configured to pivot about the horizontal swivel axes S1 and S2, and therefore pivot bottles or similar containers 2 radially about the horizontal swivel axes S1 and S2. In another embodiment, the holder 7 is connected to or comprises a swiveling arrangement that is configured to swivel bottles or similar containers 2 radially about the horizontal swivel axes S1 and S2.

Figure 2A:
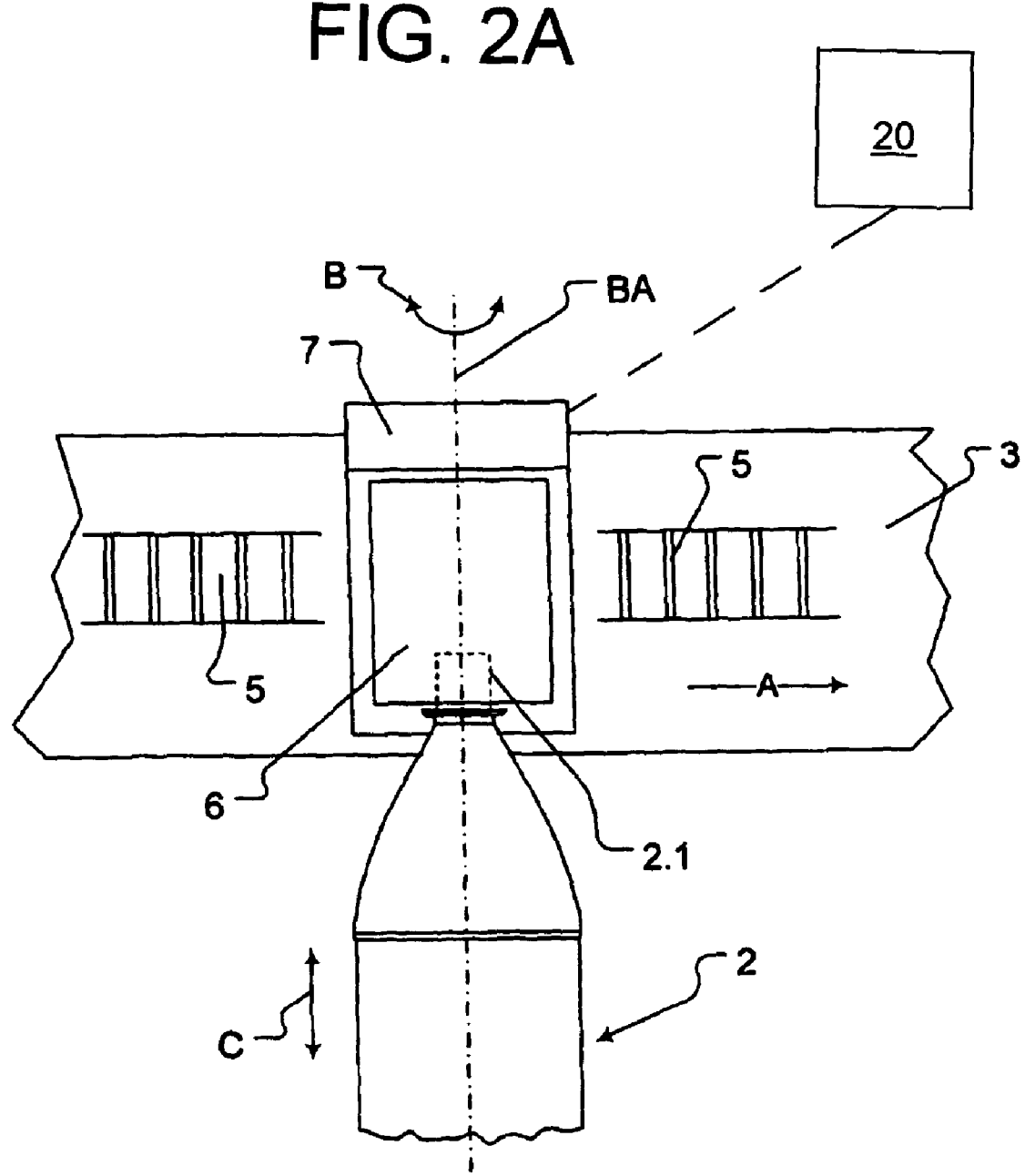
FIG. 2A is a simplified representation of one of the container mounts, including a motor and/or control device for the operation of the container mount.

FIG. 2A shows the arrangement of the container mount 6 on the transport element 3, in addition to a motor or control device 20 for the controlled movement of the container mounts 6, in the directions of transport A, B, and C.

Figure 2B:
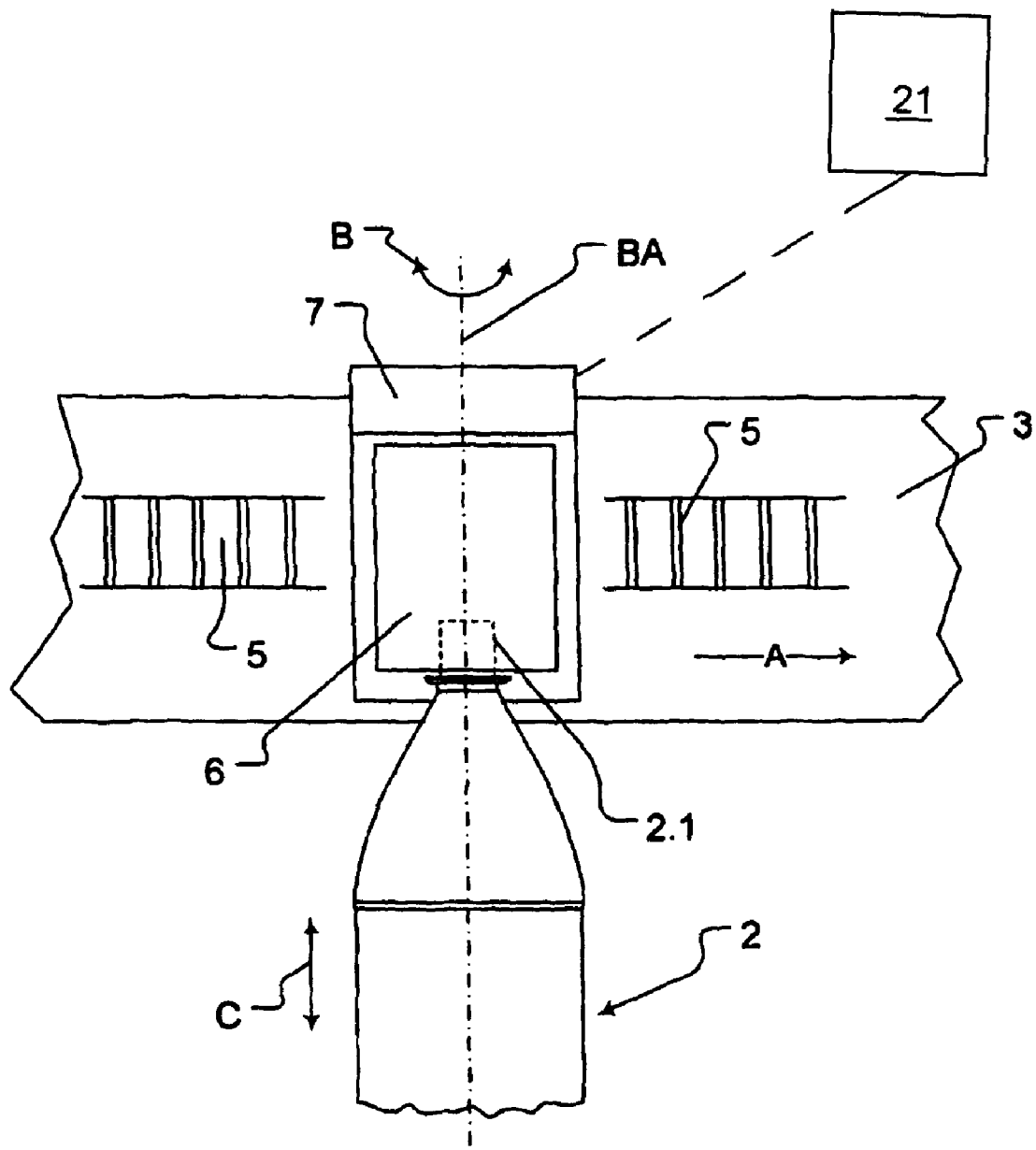
FIG. 2B is a simplified representation of one of the container mounts, including a cam and/or control device for the operation of the container mount.

FIG. 2B shows the arrangement of the container mount 6 on the transport element 3, in addition to a cam 21 for the controlled movement of the container mounts 6, in the directions of transport A, B, and C.

As shown in FIG. 3, each container mount 6, from a starting position in which the axis of the container mount 6 or the bottle or container axis BA arranged coaxial thereto are in a vertical orientation, can be swiveled by control action around a horizontal axis S1 perpendicular or virtually perpendicular to the direction of transport A by an angle +α such that the bottom 2.2 of the swiveled bottle 2 leads in the direction of transport A and by an angle −α such that the bottom 2.2 of the swiveled bottle 2 trails in the direction of transport A.

These swivel angles can be ninety degrees or more.

Figure 3A:
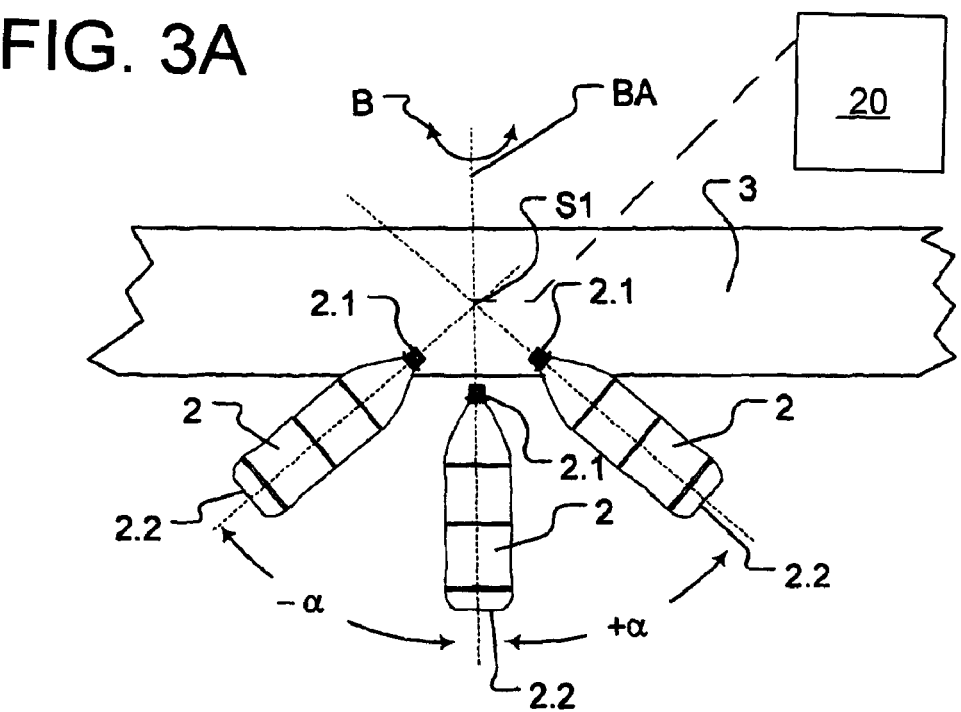
FIGS. 3A and 4A show the belt-like transport element of the conveyor similar to that which is seen in FIGS. 3 and 4, including a motor and/or control device for the operation of the container receptacle.

FIG. 3A further illustrates the movement of a bottle 2 from a starting position along the horizontal axis of the container mount 6 and/or the bottle or container axis BA, to a position transverse to the direction of transport A by an angle +α such that the bottom 2.2 of the swiveled bottle 2 leads in the direction of transport A and by an angle −α such that the bottom 2.2 of the swiveled bottle 2 trails in the direction of transport A. In other words, the container mount 6 and/or the holder 7 is configured to pivot radially about the horizontal swivel axis S1 by a distance of +α and/or −α. The controlled movement of the bottle 2, container mount 6, and/or holder 7 is performed by the control device 20.

Figure 3B:
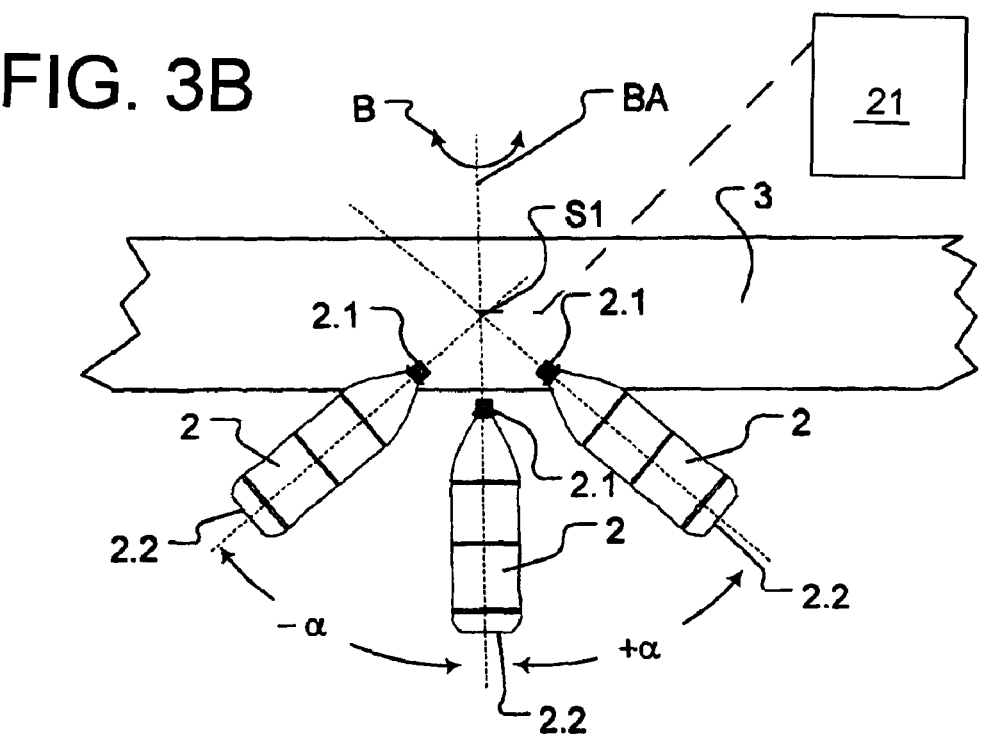
FIGS. 3B and 4B show the belt-like transport element of the conveyor similar to that which is seen in FIGS. 3 and 4, including a cam and/or control device for the operation of the container receptacle.

FIG. 3B further illustrates the movement of a bottle 2 from a starting position along the axis of the container mount 6 or the bottle or container axis BA, to a position transverse to the direction of transport A by an angle +α such that the bottom 2.2 of the swiveled bottle 2 leads in the direction of transport A and by an angle −α such that the bottom 2.2 of the swiveled bottle 2 trails in the direction of transport A. In other words, the container mount 6 and/or the holder 7 is configured to pivot radially about the horizontal swivel axis S1 by a distance of +α and/or −α. The controlled movement of the bottle 2, container mount 6, and/or holder 7 is performed by the cam 21.

Also, FIG. 4 shows that each container mount 6 can also be swiveled around a swivel axis S2 parallel or virtually parallel to the direction of transport A, for example by control action from a vertical starting position by an angle β, which can be greater than one hundred eighty degrees.

Figure 4A:
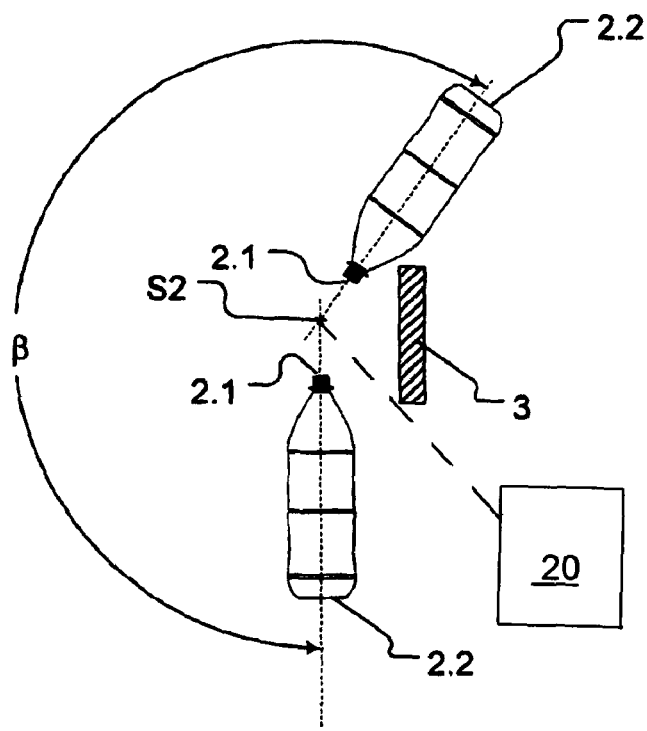

FIG. 4A further shows the movement of a container mount 6 in the direction parallel or virtually parallel to the direction of transport A. In other words, the counter mount 6 and/or the holder 7 is configured to pivot radially about the horizontal swivel axis S2 by a distance of β. The controlled movement of the bottle 2, container mount 6, and/or holder 7 is performed by the control device 20.

Figure 4B:
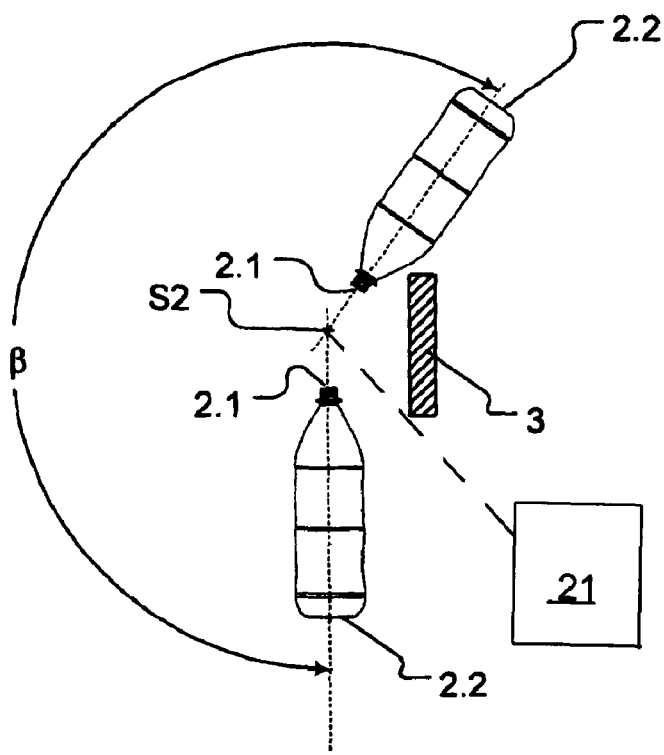

FIG. 4B further shows the movement of a container mount 6 in the direction parallel or virtually parallel to the direction of transport A. In other words, the counter mount 6 and/or the holder 7 is configured to pivot radially about the horizontal swivel axis S2 by a distance of β. The controlled movement of the bottle 2, container mount 6, and/or holder 7 is performed by the cam 21.

As suggested by arrow B, each container mount 6 can also be rotated around its axis or the container axis BA, including such that each container mount 6 can be rotated by control action around the axis BA by predefined angles in each direction from a starting position, for example.

Each container mount 6 can also be driven around the axis BA, with these rotary motions also possible with the container mount 6 swiveled.

In one possible embodiment of the present application, the use of a motor drive or electromotor drive allows the speed of rotation around the axis BA to be chosen freely.

Furthermore, in one possible embodiment of the present application, each container mount 6 can be moved along at least one axis, for example along the axis BA by a predefined stroke, such as to pick the bottles 2 up from the transport band 8 or to set them down on the transport band 9, as is suggested by the double arrow C in FIG. 2.

Various drive concepts are possible for the various movements, in one possible embodiment of the present application, for the controlled swivel, rotary and stroke movements of the container mounts, such as motor drives and/or actuators on the individual container mounts 6 and/or drive and control elements that do not move with the transport element 3, are located in the line of motion of the container mounts 6 and interact with the control and/or drive elements or gearing on the container mounts 6.

The container mounts 6 can be realized in a wide variety of forms, such as the gripper heads described previously, but also as vacuum holders, receptacles, etc.

In one possible embodiment of the present application, the conveyor 1 picks up bottles or similar containers 2 from a platform, i.e. a flat surface on which the container bottom 2.2 is resting to support the bottle or container 2, the container receptacle 6 and/or the holder 7 moves to grip the container 2 by the container mouth 2.1.

In another possible embodiment of the present application, the receptacle 6 of the conveyor 1 receives a bottle or container 2 from a gripper that holds and/or supports the bottle or container 2 by the neck of the bottle 2. In such an embodiment, the container receptacle or mount 6 and/or holder 7 may not need to move vertically to grab the container 2 by the container mouth 2.1. For example, once the container receptacle 6 grips the container mouth 2.1, the container receptacle 6 and/or the holder 7 does not move vertically but instead swivels or pivots the bottles along at least one of the horizontal swivel axes S1 and S2.

Figure 5:
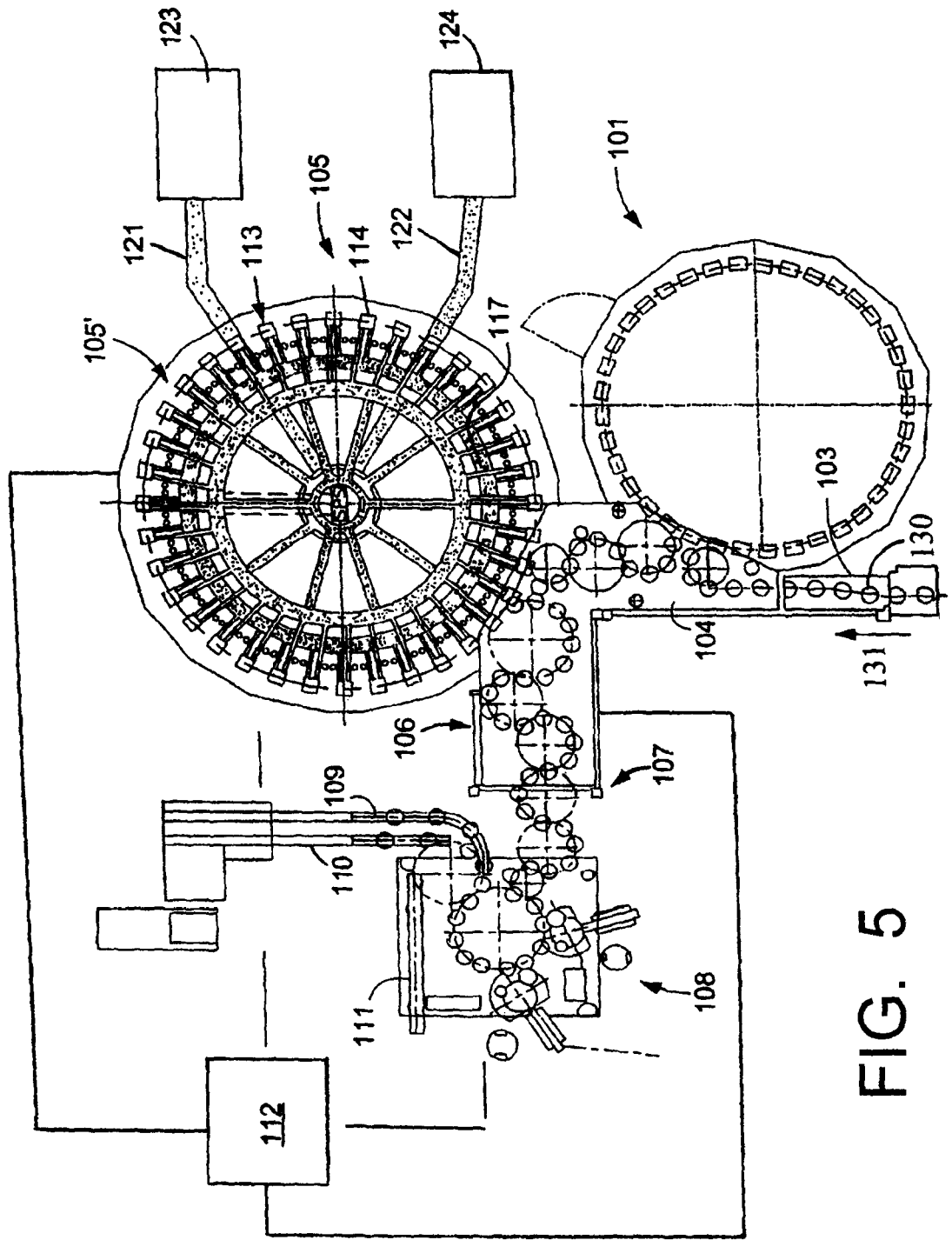
FIG. 5 shows schematically the main components of one possible embodiment example of a system for filling containers, specifically, a beverage bottling plant for filling bottles or similar containers with at least one liquid beverage, utilizing the conveyor according to the present application.

FIG. 5 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 5 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 5, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

In one possible embodiment of the present application, the conveyor 104, which transports bottles or containers from the rinsing station 101 to the filling machine 105, could be realized as the conveyor 1 of the present application. A container receptacle 6 grips a bottle 2 by the container mouth 2.1 in the vicinity of the rinsing station 101. The conveyor 1 transports the bottle or container 2 along the length of the conveyor 1 to the rinsing machine 105. As the conveyor 1 transports the bottle or container 2, the container receptacle 6 is moved, with controlled swivel movements, around at least one of the swivel axes S1 and S2. Swiveling the bottle or container 2 along at least one of the swivel axes S1 and S2 promotes optimal drying of the external and internal surfaces of a bottle or container 2. The container receptacle 6 then releases the container or bottle 2 in the vicinity of the filling machine 105, with the bottle or container 2 oriented to facilitate filling.

Figure 6:
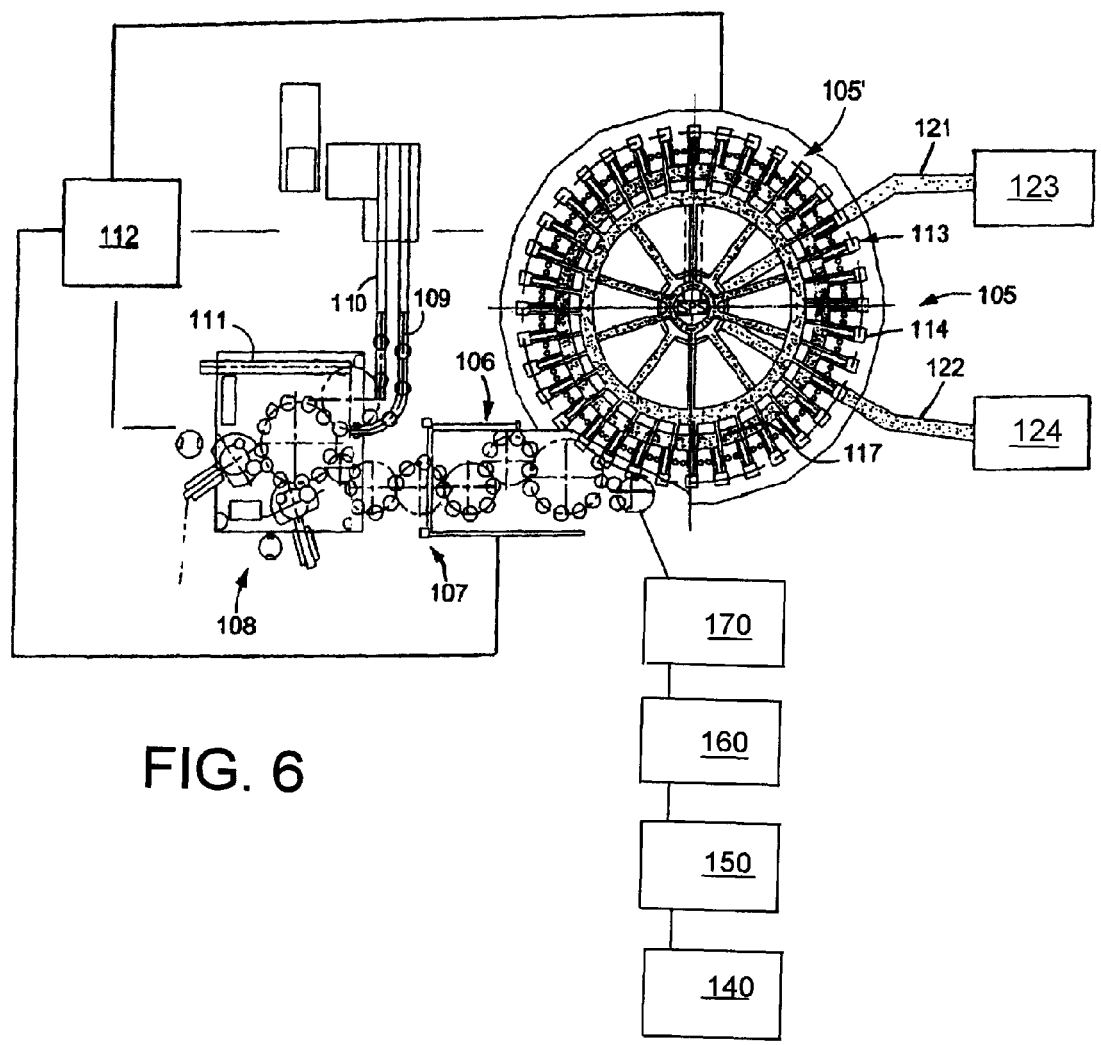
FIG. 6 shows schematically the main components of one possible embodiment of a system for filling containers, including the conveyor of the present application, a washer, a rinser, and a dryer.

Another such embodiment, as illustrated in FIG. 6, further comprises a cleaning station 140, a rinsing station 150, and an inverting station 160. The cleaning station 140 washes and/or sterilizes bottles or containers 2. The rinsing station 150 rinses the bottles or containers 2 after the bottles or containers 2 have been washed and/or sterilized by the cleaning station 140. The inverting station 160, which comprises the conveyor 1, inverts the bottles or containers 2 between the cleaning station 150 and the filling machine 105. The bottles or containers 2 are then transported to the filling machine 105. An optional drying station 170, included in FIG. 6 is configured to dry bottles or containers 2 by the application of heat, energy, ultraviolet light, etc.

The present application was described above with reference to one possible embodiment.

It will be understood that numerous modifications and derivations are possible without departing from the teaching on which the present application is based.

For example, it is possible to design the transport element 3 such that it comprises at least two or more than two parallel or virtually parallel individual elements such as chains, bands, belts, etc., each of which forms one loop with the individual container mounts 6 held between these individual elements, for example.

The present application was described above with reference to a conveyor 1 for bottles 2.

The conveyor 1, with modification of the container mounts 6, if desired, is, of course, also suited for other containers or packaging of metal and/or plastic and/or cardboard, and also in one possible embodiment of the present application for cans, jars, tubes, etc.

It may also not be mandatory that the plane of the loop of the powered, closed-loop transport element 3 be a horizontal plane; this plane can be tilted from the horizontal and/or, given suitable configuration of the transport element, can have one or more curves and/or the different sections of the loop formed by the transport element can run on a series of planes with different relative inclinations.

It is also possible to move the container mounts 6 relative to the transport element 3 in the direction of the axis BA, and also in the direction of at least one of the axes S1 and S2.

The following patents, patent applications or patent publications, are hereby incorporated by reference as if set forth in their entirety herein: EP 0 573 352, having the following English translation of the French title "APPARATUS FOR LOADING CONTAINERS ON A CONVEYOR," and having inventor Alain EVRARD.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

At least one container mount for suspending at least one container is provided on the transport element of a conveyor for bottles or similar containers having at least one powered, closed-loop transport element.

One feature or aspect of an embodiment is believed at the time of the filing of this patent application to possibly reside broadly in a conveyor for bottles or similar containers 2 having at least one powered, closed loop transport element 3, with at least one container mount 6 on the transport element 3 for at least one container 2, wherein the at least one container mount 6 is designed to move around and/or along at least one axis BA, S1, S2 on the transport element 3.

Another feature or aspect of an embodiment is believed at the time of the filing of this patent application to possibly reside broadly in the conveyor, wherein the at least one container mount 6 is designed to suspend at least one container 2.

Yet another feature or aspect of an embodiment is believed at the time of the filing of this patent application to possibly reside broadly in the conveyor, wherein the container mount 6 is attached to the transport element 3 such that the container mount 6 can be swiveled around at least one swivel axis S1, S2, and in one possible embodiment swiveled by control action.

Still another feature or aspect of an embodiment is believed at the time of the filing of this patent application to possibly reside broadly in the conveyor, wherein the at least one swivel axis S1, S2 is oriented in the direction of transport A of the transport element 3 or is perpendicular or virtually perpendicular to the direction of transport A.

A further feature or aspect of an embodiment is believed at the time of the filing of this patent application to possibly reside broadly in the conveyor, wherein the at least one container mount 6 can be swiveled such that the section of the container 2 held by the container mount 6 farthest away from the container mount 6 when swiveled, e.g. the container bottom 2.2 leads or trails that part of the container 2.1 held by the container mount 6 relative to the direction of transport A of the transport element 3.

Another feature or aspect of an embodiment is believed at the time of the filing of this patent application to possibly reside broadly in the conveyor, wherein the at least one container mount 6 can be swiveled around the swivel axis S2 such that the container 2 is reversed in the swiveled state, i.e. is held with that part of the container 2.1 held by the container mount 6 at the bottom.

Yet another feature or aspect of an embodiment is believed at the time of the filing of this patent application to possibly reside broadly in the conveyor, wherein the at least one container mount 6 can be rotated around an axis, in one possible embodiment around the axis BA of the container 2 held by the container mount 6.

Still another feature or aspect of an embodiment is believed at the time of the filing of this patent application to possibly reside broadly in the conveyor, wherein the at least one container mount 6 can be rotated around the axis BA by angle control action.

A further feature or aspect of an embodiment is believed at the time of the filing of this patent application to possibly reside broadly in the conveyor, wherein the at least one container mount 6 can be driven around the axis BA.

Another feature or aspect of an embodiment is believed at the time of the filing of this patent application to possibly reside broadly in the conveyor, wherein the at least one container mount 6 can be moved relative to the transport element 3 along the axis BA of the container 2 held by the container mount 6.

Yet another feature or aspect of an embodiment is believed at the time of the filing of this patent application to possibly reside broadly in the conveyor, wherein the at least one container mount 6 can be moved relative to the transport element 3 along at least two axes perpendicular or virtually perpendicular to one another BA, S1, S2.

Another feature or aspect of an embodiment is believed at the time of the filing of this patent application to possibly reside broadly in the conveyor, comprising drive and/or control elements for the movement of the at least one container mount along at least one axis and/or around at least one axis.

Yet another feature or aspect of an embodiment is believed at the time of the filing of this patent application to possibly reside broadly in the conveyor, wherein at least one subsection of the loop formed by the transport element 3 lies an a horizontal or nearly horizontal plane.

Still another feature or aspect of an embodiment is believed at the time of the filing of this patent application to possibly reside broadly in the conveyor, wherein at least one subsection of the loop formed by the transport element 3 lies in a plane inclined relative to the horizontal.

A further feature or aspect of an embodiment is believed at the time of the filing of this patent application to possibly reside broadly in the conveyor, comprising a plurality of container mounts 6 arranged on the transport element 3 offset from one another in the direction of transport A.

Another feature or aspect of an embodiment is believed at the time of the filing of this patent application to possibly reside broadly in the conveyor, wherein the transport element 3 comprises at least one belt and/or chain and/or band.

Yet another feature or aspect of an embodiment is believed at the time of the filing of this patent application to possibly reside broadly in the conveyor, wherein the drive and/or control elements are provided at least in part on the transport element 3 and/or on at least one container mount 6.

Still another feature or aspect of an embodiment is believed at the time of the filing of this patent application to possibly reside broadly in the conveyor, wherein the drive and/or control elements are provided at least in part in the line of motion of the at least one container mount 6 and do not move with said mount 6, e.g. are on a machine rack.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of apparatus and methods of sterilizing or cleaning containers that may possibly be utilized or possibly adapted for use in at least one possible embodiment of the present application may possibly be found in the following U.S. Patents: U.S. Pat. No. 5,092,356 issued to Grot on Mar. 3, 1992; U.S. Pat. No. 5,320,144 issued to Ahlers on Jun. 14, 1994; U.S. Pat. No. 5,533,552 issued to Ahlers on Jul. 9, 1996; U.S. Pat. No. 5,558,135 issued to Kronseder et al. on Sep. 24, 1996; and U.S. Pat. No. 5,896,899 issued to Schlitz on Apr. 27, 1999.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The Innoclean SEC bottle washing machine, manufactured by KHS AG, located at D-44127 Dortmund, Federal Republic of Germany, is an example of a bottle washer which may possibly be utilized or adapted for use in at least one possible embodiment. Some other examples of bottle washers or bottle rinsers which may possibly be utilized or adapted for use in at least one possible embodiment, which are also manufactured by KHS AG, may include: the Innoclean FR-ZR, the Innoclean FR-DR, the Innoclean FR-ZM, and the Innoclean FR-EM.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of dryers or dryer units which may possibly be utilized or adapted for use in at least one possible embodiment may possibly be found in the following US patents and patent applications: U.S. Pat. No. 4,537,749, having the title "PROCESS AND DEVICE FOR STERILIZING TUB-SHAPED CONTAINERS," published on Aug. 27, 1985; U.S. Pat. No. 4,631,173, having the title "METHOD OF STERILIZING PACKAGING MATERIAL, ESPECIALLY CONTAINER-TYPE PACKAGES," published on Dec. 23, 1986; U.S. Pat. No. 5,178,841, having the title "STERILIZING APPARATUS," published on Jan. 12, 1993; U.S. Pat. No. 7,010,900, having the title "BEVERAGE BOTTLING PLANT FOR FILLING BOTTLES WITH A LIQUID BEVERAGE FILLING MATERIAL, AND A CLEANING DEVICE FOR CLEANING BOTTLES IN A BEVERAGE BOTTLING PLANT," published on Mar. 14, 2006; and Patent Application No. 2002/0159915, having the title "VAPOR PHASE DECONTAMINATION OF CONTAINERS," published on Oct. 31, 2002.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of grips or grippers which may possibly be utilized or adapted for use in at least one possible embodiment may possibly be found in the following U.S. patents: U.S. Pat. No. 6,905,012, having the title "DEVICE FOR CONVERTING A HOLLOW BODY," published on Jun. 14, 2005; U.S. Pat. No. 7,140,161, having the title "BEVERAGE BOTTLING PLANT FOR FILLING BOTTLES WITH A LIQUID BEVERAGE FILLING MATERIAL, HAVING CONTAINER HANDLING MACHINES WITH CARRYING POCKETS," published on Nov. 28, 2006; U.S. Pat. No. 7,200,975, having the title "BEVERAGE BOTTLING PLANT FOR FILLING BOTTLES WITH A LIQUID BEVERAGE FILLING MATERIAL, HAVING A TRANSFER DEVICE FOR THE TRANSFER OF CONTAINERS FROM A TRANSFER STARWHEEL TO THE CAROUSEL OF A CONTAINER HANDLING MACHINE," published on Apr. 10, 2007; U.S. Pat. No. 7,309,203, having the title "MULTIMODAL CONTAINER HANDLING SYSTEM," published on Dec. 18, 2007; and U.S. Pat. No. 7,399,435, having the title "METHOD AND DEVICE FOR PRODUCING HOLLOW BODIES OF PLASTIC," published on Jul. 15, 2008.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of motors which may possibly be utilized or adapted for use in at least one possible embodiment may possibly be found in the following U.S. patents: U.S. Pat. No.

7,416,142, having the title "METHODS AND APPARATUS FOR PROCESSING RECYCLABLE CONTAINERS," published on Aug. 26, 2008; U.S. Pat. No. 7,392,632, having the title "BEVERAGE BOTTLING PLANT WITH A BEVERAGE BOTTLE HANDLING MACHINES HAVING BEVERAGE BOTTLE TRANSFER STATIONS AND A METHOD OF OPERATION THEREOF," published on Jul. 1, 2008; U.S. Pat. No. 7,261,199, having the title "NECK GRIPPING CONVEYOR AND LINK, AND RELATED ROTARY FILLER AND SYSTEM," published on Aug. 28, 2007; U.S. Pat. No. 5,934,440, having the title "CONVEYOR DEVICE FOR INSPECTING CONTAINERS AND TRANSPORTING THEM TO SELECTED DESTINATIONS," published on Aug. 10, 1999; and U.S. Pat. No. 5,249,689, having the title "HANDLING AND COMPACTING OF EMPTY BEVERAGE CANS," published on Oct. 5, 1993.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

All of the patents, patent applications or patent publications, which were cited in the International Search Report, and/or cited elsewhere are hereby incorporated by reference as if set forth in their entirety herein as follows: U.S. Pat. No. 6,905,012, having the title "DEVICE FOR INVERTING A HOLLOW BODY," published on Jun. 14, 2005; DE 184 304, having the German title "FLASCHENTAUCH- UND EINWEICHVORRICHTUNG FÜR MEHRTEILIGE EINWEICHBEHÄLTER;" EP 0 875 459, having the English translation of German title "TUBE FILLING MACHINE," published on Nov. 4, 1998; DE 41 28 733, having the German title "TRANSPORTVERFAHREN FUER IN EINEM STROM ANFALLENDE STUECKGUETER, TRANSPORTEINRICHTUNG HIERFUER, VERFAHREN ZUR POSITIONSBESTIMMUNG EINER MARKIERUNG MITTELS EINES DERARTIGEN TRANSPORTVERFAHRENS UND ANLAGE HIERFUER," published on Mar. 4, 1993; U.S. Pat. No. 3,367,472, having the title "DEVICE FOR AUTOMATIC INTRODUCTION AND DISCHARGE OF CONTAINERS IN PAINTING MACHINES AND THE LIKE," published on Feb. 6, 1938; and EP 0 573 352, having the English translation of the German title "APPARATUS FOR LOADING CONTAINERS ON A CONVEYOR," published Dec. 8, 1993.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 022 465.5, filed on May 13, 2006, having inventors Herbert MENKE, Martin WEISGERBER, and Ralph POHL, and DE-OS 10 2006 022 465.5 and DE-PS10 2006 022 465.5, and International Application No. PCT/EP2007/004178, filed on May 11, 2007, having WIPO Publication No. WO2007/131713 and inventors Herbert MENKE, Martin WEISGERBER, and Ralph POHL, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/004178 and German Patent Application 10 2006 022 465.5 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/004178 and DE 10 2006 022 465.5 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

PARTIAL LIST OF NOMENCLATURE

1 Conveyor
2 Bottle
2.1 Bottle mouth
2.2 Bottle bottom
3 Transport element
4 Deflecting wheel
5 Gearing
6 Container receptacle
7 Holder or bearing
8, 9 Transport band
A Direction of transport
B Rotary motion
C Lifting motion
BA Container axis
S1, S2 Swivel axis
α, β Swivel angle

What is claimed is:

1. A conveyor being configured to transport beverage bottles in a beverage bottling plant, said conveyor comprising:

a first rotor being configured and disposed to rotate about a vertical rotational axis;
a second rotor being configured and disposed to rotate about a vertical rotational axis;
a continuous band being configured and disposed to form a closed, endless loop around said first rotor and said second rotor;
said continuous band being further configured to be driven in a horizontal transport direction by said first rotor and said second rotor;
a plurality of pivoting arrangements being disposed on said continuous band and being configured to move in a horizontal transport direction;
each of said plurality of pivoting arrangements comprising a beverage bottle receptacle being configured and disposed to hold beverage bottles;
each of said plurality of pivoting arrangements further comprising:
  a first side leading in a horizontal transport direction;
  a second side trailing in a horizontal transport direction;
  a first horizontal pivoting axis which extends substantially parallel to said first side and said second side;
  a second horizontal pivoting axis which extends substantially perpendicular to said first side and said second side;
  the first horizontal pivoting axis being substantially perpendicular to the second horizontal pivoting axis; and
each of said plurality of pivoting arrangements being configured to at least two of (A), (B), and (C):
  (A) move a beverage bottle at least one of:
    in an up direction; and
    in a down direction;
  (B) pivot a beverage bottle about the first horizontal pivoting axis; and
  (C) pivot a beverage bottle about the second horizontal pivoting axis.

2. The conveyor according to claim 1, wherein:
said beverage bottle receptacle is designed to suspend at least one beverage bottle;
said beverage bottle receptacle is attached to said continuous band such that said beverage bottle receptacle can be swivelled around at least one of the first horizontal pivoting axis and the second horizontal pivoting axis, and swivelled by control action; and
the first horizontal pivoting axis is oriented in a horizontal direction of transport of said continuous band or is substantially perpendicular to a horizontal direction of transport.

3. The conveyor according to claim 2, wherein said beverage bottle receptacle:
can be swivelled such that a beverage bottle bottom leads or trails a beverage bottle mouth relative to a horizontal direction of transport of said continuous band;
can be swivelled around the second horizontal pivoting axis such that a beverage bottle is inverted in the swivelled state, i.e. is held with a beverage bottle mouth held by said beverage bottle receptacle at the bottom; and
can be rotated around a beverage bottle longitudinal axis of a beverage bottle held by said beverage bottle receptacle.

4. The conveyor according to claim 3, wherein said beverage bottle receptacle:
can be rotated around a longitudinal beverage bottle axis by angle control action;
can be driven around a longitudinal beverage bottle axis; and can be moved relative to said continuous band along a longitudinal beverage bottle axis of a beverage bottle held by said beverage bottle receptacle.

5. The conveyor according to claim 4, wherein:
said conveyor further comprises drive and/or control elements for the movement of said plurality of pivoting arrangements along and/or around at least one of:
the up direction;
the down direction;
pivot about the first horizontal pivoting axis; and
pivot about the second horizontal pivoting axis;
at least one portion of said closed, endless loop formed by said continuous band lies an a horizontal or nearly horizontal plane; and
at least one portion of said closed, endless loop formed by said continuous band lies in a plane inclined relative to the horizontal.

6. The conveyor according to claim 5, wherein:
said plurality of pivoting arrangements disposed on said continuous band are offset from one another in a horizontal direction of transport;
said continuous band comprises at least one belt and/or chain and/or band.

7. The conveyor according to claim 6, wherein said drive and/or control elements are provided:
at least in part on said continuous band and/or on at least one of said beverage bottle receptacles; and
at least in part in the line of motion of said plurality of pivoting arrangements and do not move with said plurality of pivoting arrangements, e.g. are on a machine rack.

8. A conveyor being configured to transport containers in a container plant, said conveyor comprising:
a plurality of rotors, each of which being configured and disposed to rotate about a rotational axis;
a continuous band being configured and disposed to form a closed, endless loop around said plurality of rotors;
said continuous band being further configured to be driven in a transport direction by at least one of said plurality of rotors;
a plurality of pivoting arrangements being disposed on said continuous band and being configured to move with said continuous band in a transport direction;
each of said plurality of pivoting arrangements comprising a container receptacle being configured and disposed to hold containers;
each of said plurality of pivoting arrangements being configured to move a container in at least two of:
a first sense;
a second sense; and
a third sense;
said first sense, said second sense, and said third sense being all transverse with respect to one another.

9. The conveyor according to claim 8, wherein:
said conveyor is further configured to move a container in at least one of:
said first sense, which is up and down;
said second sense, which is a pivoting sense; and
said third sense, which is a pivoting sense;
said beverage bottle receptacle is designed to suspend at least one beverage bottle;
said container receptacle is attached to said continuous band such that said container receptacle can be swivelled in said second sense and said third sense, and swivelled by control action; and
said second sentence is oriented in a direction of transport of said continuous band or is substantially perpendicular to a direction of transport.

10. The conveyor according to claim 9, wherein said container receptacle:
can be swivelled such that a container bottom leads or trails a container mouth relative to a direction of transport of said continuous band;
can be swivelled in said third sense such that a container is inverted in the swivelled state, i.e. is held with a container mouth held by said container receptacle at the bottom; and
can be rotated around a container longitudinal axis of a container held by said container receptacle.

11. The conveyor according to claim 10, wherein said container receptacle:
can be rotated around a longitudinal container axis by angle control action;
can be driven around a longitudinal container axis; and
can be moved relative to said continuous band along a longitudinal container axis of a container held by said container receptacle.

12. The conveyor according to claim 11, wherein:
said conveyor further comprises drive and/or control elements for the movement of said plurality of pivoting arrangements along and/or around at least one of:
said first sense;
said second sense; and
said third sense;
at least one portion of said closed, endless loop formed by said continuous band lies an a horizontal or nearly horizontal plane; and
at least one portion of said closed, endless loop formed by said continuous band lies in a plane inclined relative to the horizontal.

13. The conveyor according to claim 12, wherein:
said plurality of pivoting arrangements disposed on said continuous band are offset from one another in a direction of transport;
said continuous band comprises at least one belt and/or chain and/or band.

14. The conveyor according to claim 13, wherein said drive and/or control elements are provided:
at least in part on said continuous band and/or on at least one of said container receptacles;
at least in part in the line of motion of said plurality of pivoting arrangements and do not move with said plurality of pivoting arrangements, e.g. are on a machine rack; and
said plurality of visiting arrangements is configured to pivot bottles in a rinsing machine in a bottling plant.

15. Conveyor for bottles or similar containers (2) having at least one powered, closed loop transport element (3), with at least one container mount (6) on the transport element (3) for at least one container (2), characterized in that the at least one container mount (6) is designed to move around and/or along at least two transverse axes BA, S1, and S2 on the transport element (3), wherein:
BA comprises a container axis;
S1 comprises a first swivel axis; and
S2 comprises a second swivel axis.

16. Conveyor according to claim 15, characterized in that:
the at least one container mount (6) is designed to suspend at least one container (2);
the container mount (6) is attached to the transport element (3) such that the container mount (6) can be swivelled around at least one swivel axis (S1, S2), and preferably swivelled by control action; and the at least one swivel axis (S1, S2) is oriented in the direction of transport (A) of the transport element (3) or is perpendicular to the direction of transport (A).

17. Conveyor according to claim 16, characterized in that the at least one container mount (6):

can be swivelled such that that section of the container (2) held by the container mount (6) farthest away from the container mount (6) when swivelled, e.g. the container bottom (2.2) leads or trails that part of the container (2.1) held by the container mount (6) relative to the direction of transport (A) of the transport element (3);

can be swivelled around the swivel axis (S2) such that the container (2) is reversed in the swivelled state, i.e. is held with that part of the container (2.1) held by the container mount (6) at the bottom; and can be rotated around an axis, preferably around the axis (BA) of the container (2) held by the container mount (6).

18. Conveyor according to claim 17, characterized in that the at least one container mount (6):

can be rotated around the axis (BA) by angle control action;

can be driven around the axis (BA);

can be moved relative to the transport element (3) along the axis (BA) of the container (2) held by the container mount (6); and can be moved relative to the transport element (3) along at least two axes perpendicular to one another (BA, S1, S2).

19. Conveyor according to claim 18:

characterized by drive and/or control elements for the movement of the at least one container mount along at least one axis and/or around at least one axis;

characterized in that at least one subsection of the loop formed by the transport element (3) lies an a horizontal or nearly horizontal plane;

characterized in that at least one subsection of the loop formed by the transport element (3) lies in a plane inclined relative to the horizontal; and characterized by a plurality of container mounts (6) arranged on the transport element (3) offset from one another in the direction of transport (A).

20. Conveyor according to claim 19, characterized in that:

the transport element (3) comprises at least one belt and/or chain and/or band;

the drive and/or control elements are provided at least in part on the transport element (3) and/or on at least one container mount (6); and the drive and/or control elements are provided at least in part in the line of motion of the at least one container mount (6) and do not move with said mount (6), e.g. are on a machine rack.

* * * * *